US009380251B2

(12) United States Patent
Kang et al.

(10) Patent No.: US 9,380,251 B2
(45) Date of Patent: Jun. 28, 2016

(54) METHOD FOR PERFORMING CHANNEL SCAN WITHIN A MULTI-CHANNEL BROADCASTING PROGRAM RECEIVER, AND ASSOCIATED MULTI-CHANNEL BROADCASTING PROGRAM RECEIVER

(75) Inventors: Chih-Wei Kang, Taipei (TW); Lu-Chung Chien, Taipei (TW); Ray-Kuo Lin, Taipei County (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 1238 days.

(21) Appl. No.: 12/477,923

(22) Filed: Jun. 4, 2009

(65) Prior Publication Data

US 2010/0309388 A1 Dec. 9, 2010

(51) Int. Cl.
*H04N 5/50* (2006.01)
*H04N 5/46* (2006.01)
*H04N 21/434* (2011.01)
*H04N 21/426* (2011.01)

(52) U.S. Cl.
CPC . *H04N 5/50* (2013.01); *H04N 5/46* (2013.01); *H04N 21/4263* (2013.01); *H04N 21/4345* (2013.01)

(58) Field of Classification Search
CPC ....................................................... H04N 5/50
USPC ................................................ 348/570, 732
See application file for complete search history.

(56) References Cited

U.S. PATENT DOCUMENTS

| 7,383,567 B2 | 6/2008 | Cang | |
|---|---|---|---|
| 2002/0157106 A1* | 10/2002 | Uskali et al. | 725/107 |
| 2003/0023984 A1* | 1/2003 | Cang et al. | 725/126 |
| 2006/0037059 A1 | 2/2006 | Jin | |
| 2007/0098089 A1* | 5/2007 | Li et al. | 375/260 |
| 2008/0030626 A1* | 2/2008 | Tseng | 348/732 |
| 2009/0044247 A1* | 2/2009 | Shibahara | 725/152 |

FOREIGN PATENT DOCUMENTS

| EP | 1819152 | 8/2007 |
|---|---|---|
| TW | I221736 | 10/2004 |

* cited by examiner

*Primary Examiner* — Michael Hong
(74) *Attorney, Agent, or Firm* — Winston Hsu; Scott Margo

(57) ABSTRACT

A method for performing channel scan within a multi-channel broadcasting program receiver includes: calculating a plurality of frequency representatives of intermediate frequency (IF) signals of one or more received multi-channel broadcasting program signals within a specific band of a plurality of bands; and locating a video IF signal out of the IF signals according to the frequency representatives in order to determine a frequency of a video carrier corresponding to the specific band, wherein the frequency of the video carrier is utilized as a reference for tuning to an associated channel. An associated multi-channel broadcasting program receiver includes a tuner, a processing module, a memory and a controller. The tuner is arranged to select one of a plurality of channels. In particular, the controller controls channel scan and further utilizes the frequency of the video carrier corresponding to the specific band as the reference for tuning to the associated channel.

18 Claims, 8 Drawing Sheets though only a portion of possible carriers are correct video carriers. Users may feel annoyed and may become impatient since they always need to wait for a long time to watch TV/listen to program when traveling to a new location.

METHOD FOR PERFORMING CHANNEL SCAN WITHIN A MULTI-CHANNEL BROADCASTING PROGRAM RECEIVER, AND ASSOCIATED MULTI-CHANNEL BROADCASTING PROGRAM RECEIVER

BACKGROUND

The present invention relates to a multi-channel broadcasting program system, and more particularly, to a method for performing channel scan within a multi-channel broadcasting program receiver, and to an associated multi-channel broadcasting program receiver.

Portable multi-channel broadcasting program systems such as television (TV) receivers implemented within portable devices or add-on modules have become popular since there are many attractive characteristics for user's convenience, such as portability and high flexibility. As the users may operate the portable multi-channel broadcasting program systems at different locations, and as the channels available at respective locations are not all the same, a channel scan operation is required for detecting the channels available at a specific location in advance. According to the related art, a channel scan operation is typically performed by searching video carrier signals from a predetermined lower frequency band through to a predetermined upper frequency band of a plurality of frequencies intervened with the same predetermined frequency step, whose size can be referred to as the frequency step size.

Please note that, in contrast to the range of the frequencies to be searched, the frequency step size is very small. For example, the frequency step size typically ranges from 50 KHz to 500 KHz. However, the frequencies to be searched typically ranges from 45.25 MHz through to 873.25 MHz. As a result of applying the conventional channel scan method to the portable multi-channel broadcasting program systems, it usually takes too much time to find out the frequencies of all possible carriers, while only a portion of possible carriers are correct video carriers. Users may feel annoyed and may become impatient since they always need to wait for a long time to watch TV/listen to program when traveling to a new location.

In conclusion, the conventional channel scan operation does not serve the user well, and a novel method and an associated multi-channel broadcasting program receiver are required to speed up the channel scan operation.

SUMMARY

It is therefore an objective of the claimed invention to provide a method for performing channel scan within a multi-channel broadcasting program receiver, and to provide an associated multi-channel broadcasting program receiver, in order to solve the above-mentioned problem.

An exemplary embodiment of a method for performing channel scan within a multi-channel broadcasting program receiver comprises: calculating a plurality of frequency representatives of intermediate frequency (IF) signals of one or more received multi-channel broadcasting program signals within a specific band of a plurality of bands; and locating a video IF signal out of the IF signals according to the frequency representatives in order to determine a frequency of a video carrier corresponding to the specific band, wherein the frequency of the video carrier is utilized as a reference for tuning to an associated channel.

An exemplary embodiment of a multi-channel broadcasting program receiver comprises a tuner and a controller. The tuner is arranged to select one of a plurality of channels, while the controller is arranged to control the multi-channel broadcasting program receiver to perform channel scan according to code embedded in the controller or received from outside the controller. In addition, the controller is arranged to calculate a plurality of frequency representatives of IF signals of one or more received multi-channel broadcasting program signals within a specific band of a plurality of bands. Additionally, the controller is arranged to locate a video IF signal out of the IF signals according to the frequency representatives in order to determine a frequency of a video carrier corresponding to the specific band, where the frequency of the video carrier is utilized as a reference for tuning to an associated channel.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
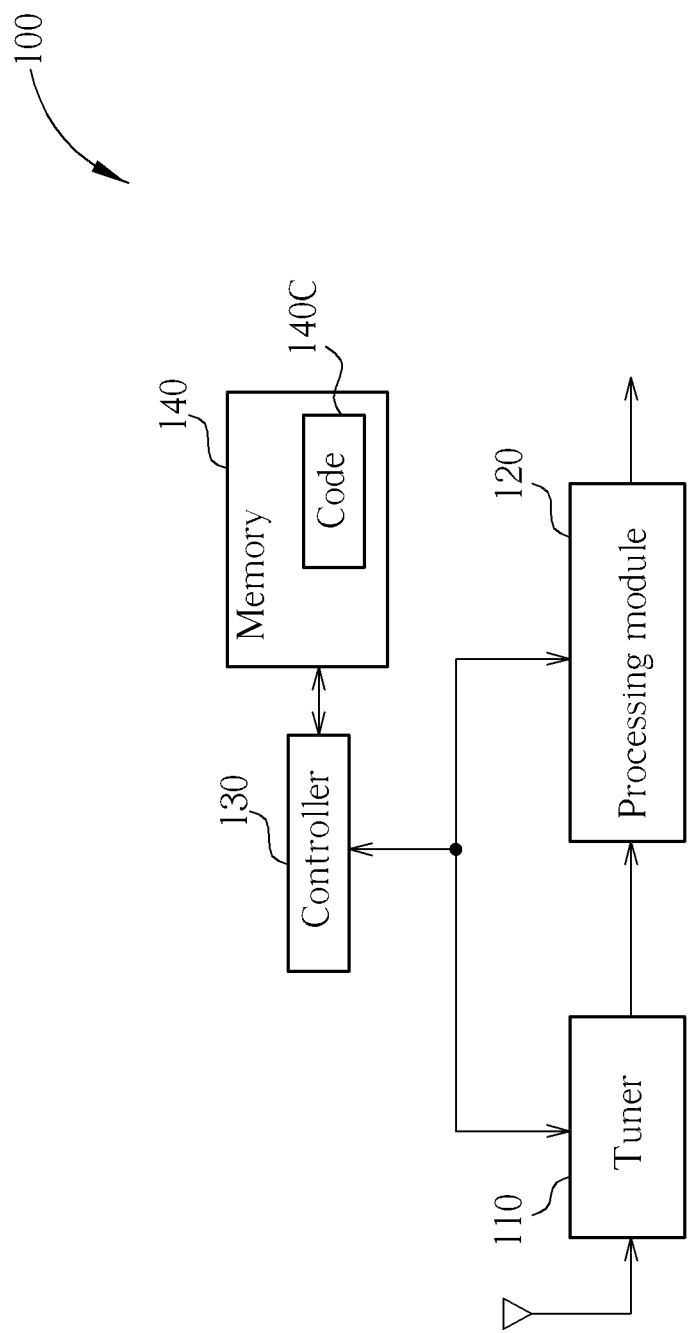
FIG. 1 is a diagram of a multi-channel broadcasting program receiver according to a first embodiment of the present invention.

Please refer to FIG. 1, which illustrates a diagram of a multi-channel broadcasting program receiver 100 according to a first embodiment of the present invention. The multi-channel broadcasting program receiver 100 comprises a tuner 110, a processing module 120, a controller 130 and a memory 140. The tuner 110 is arranged to select one of a plurality of channels, and the processing module 120 is arranged to process received multi-channel broadcasting program signals, such as received television (TV) signals. In addition, the controller 130 is arranged to control operations of the multi-channel broadcasting program receiver 100 according to program code embedded in the controller 140 or received from outside the controller 140. More particularly, the controller 130 of this embodiment is arranged to control the multi-channel broadcasting program receiver 100 to perform channel scan according to the code. In this embodiment, the controller 130 can be a micro processing unit (MPU) executing firmware code read from the memory 140, such as the code 140C stored in the memory 140. This is for illustrative purposes only, and is not meant to be a limitation of the present invention. According to a variation of this embodiment, the controller 130 can be a hardware controller with the code 140C embedded therein. The program code such as the code 140C can be stored in a memory such as the memory 140 or embedded in the control 130, depends on different variations of this embodiment.

Figure 2:
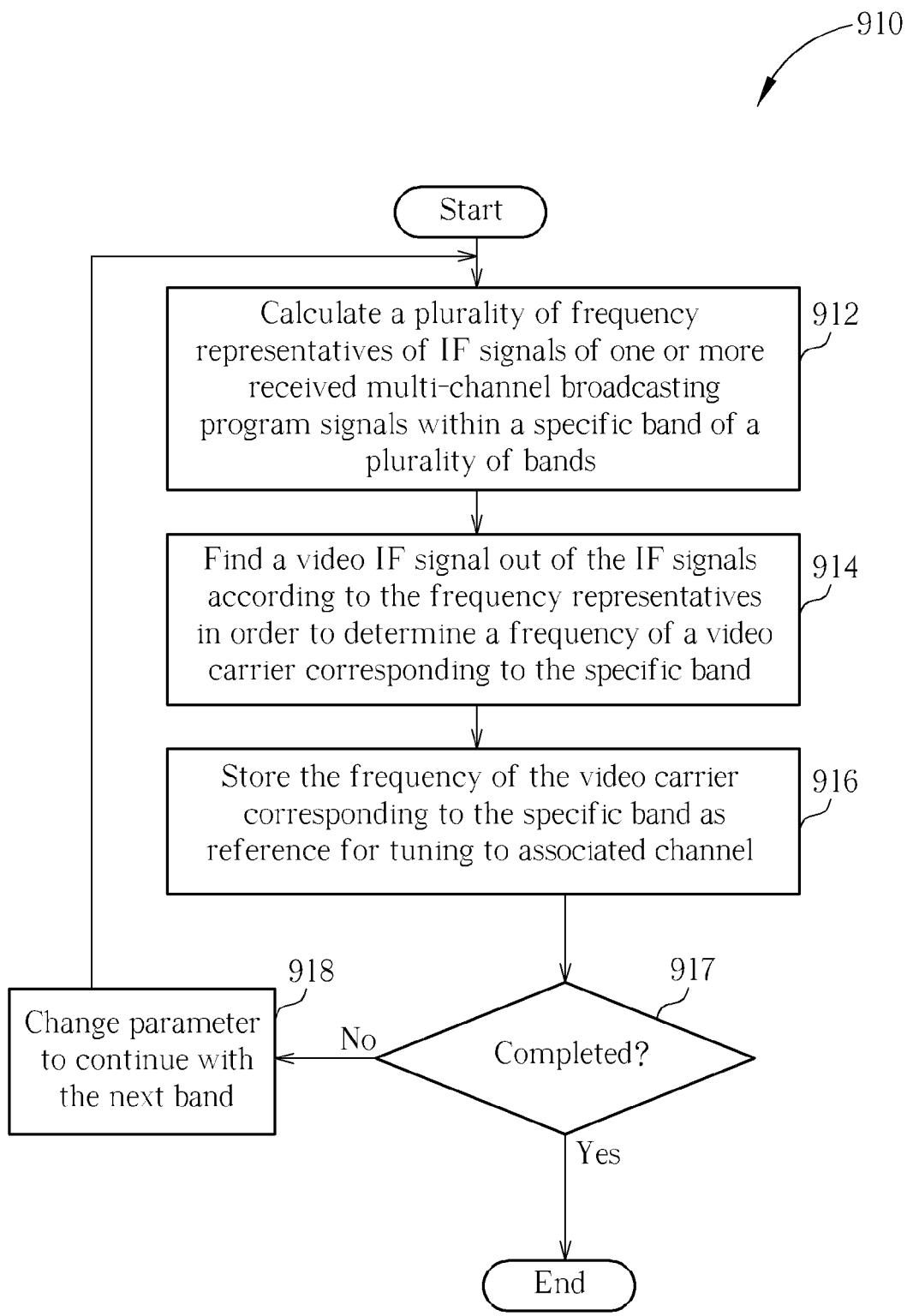
FIG. 2 is a flowchart of a method for performing channel scan within a multi-channel broadcasting program receiver according to one embodiment of the present invention.

FIG. 2 is a flowchart of a method 910 for performing channel scan within a multi-channel broadcasting program receiver according to one embodiment of the present invention. The method 910 can be applied to the multi-channel broadcasting program receiver 100 shown in FIG. 1, and can be implemented by utilizing the multi-channel broadcasting program receiver 100. The method 910 is described according to the first embodiment as follows.

In Step 912, the controller 130 executing the code 140C calculates a plurality of frequency representatives of intermediate frequency (IF) signals (e.g. some pilots such as IF versions of a video carrier and a sound carrier, and some suspicious pilots) of one or more received multi-channel broadcasting program signals within a specific band of a plurality of bands. For example, the plurality of bands comprises (N+1) bands $B(0), B(1), \ldots,$ and $B(N)$, and the specific band represents an $n^{th}$ band $B(n)$, where the loop formed with Steps 912, 914, 916, 917, and 918 starts with an initial condition of n=0. According to this embodiment, the controller 130 is arranged to perform frequency transform on the IF signals to obtain frequency transform results as the frequency representatives. In particular, the frequency transform comprises Fast Fourier Transform (FFT), and the frequency transform results are FFT results. This is for illustrative purposes only, and is not meant to be a limitation of the present invention. According to a variation of this embodiment, the frequency transform comprises Discrete Cosine Transform (DCT), and the frequency transform results are DCT results.

In Step 914, the controller 130 executing the code 140C finds (or more specifically, locates) a video IF signal out of the IF signals (e.g. some pilots such as IF versions of a video carrier and a sound carrier, and some suspicious pilots), if exists, according to the frequency representatives in order to determine a frequency of a video carrier corresponding to the specific band, where the frequency of the video carrier is utilized as a reference for tuning to an associated channel. More particularly, in a situation where the specific band represents the $n^{th}$ band $B(n)$ mentioned above, the controller 130 finds (or more specifically, locates) the video IF signal out of the IF signals of the $n^{th}$ iteration (if the video IF signal corresponding to the $n^{th}$ band $B(n)$ exists) according to the frequency representatives obtained in Step 912 in the $n^{th}$ iteration. For example, the frequency of the video carrier found in the $n^{th}$ iteration is utilized as the reference for tuning to the $n^{th}$ channel (e.g. the channel CH(n)).

In Step 916, under the control of the controller 130 executing the code 140C, a storage within the multi-channel broadcasting program receiver 100 (e.g. the memory 140 or some other memory device, which is typically a non-volatile memory) is arranged to store the frequency of the video carrier corresponding to the specific band as the reference for tuning to the associated channel. For example, in a situation where the specific band represents the $n^{th}$ band $B(n)$ mentioned above, the storage mentioned above stores the frequency of the video carrier corresponding to the $n^{th}$ band $B(n)$ (i.e. the frequency of the video carrier found in the $n^{th}$ iteration) as the reference for tuning to the associated channel, such as the $n^{th}$ channel (e.g. the channel CH(n)).

In Step 917, the controller 130 executing the code 140C determines whether the channel scan is completed. If the controller 130 determines that the channel scan is completed, the loop shown in FIG. 2 will not continue (i.e. the break of the loop ends the flowchart); otherwise, Step 918 is entered. In particular, in a situation where the specific band represents the $n^{th}$ band $B(n)$ mentioned above, the controller 130 determines whether the channel scan is completed by comparing n with N. More specifically, when n reaches N, the controller 130 determines that the channel scan is completed; otherwise (i.e. n<N in this situation), Step 918 is entered.

In Step 918, the controller 130 executing the code 140C changes at least one parameter to continue with the next band. In particular, the controller 130 simply performs an increase operation such as "n++", which causes n to be increased with an increment of one.

As a result of the (N+1) iterations of the loop shown in FIG. 2, the controller 130 calculates a plurality of frequency representatives of IF signals of one or more received multi-channel broadcasting program signals within each band of the plurality of bands such as the (N+1) bands $B(0), B(1), \ldots,$ and $B(N)$. In addition, the controller 130 eventually finds a video IF signal out of the IF signals of the one or more received multi-channel broadcasting program signals within each band, if the video IF signal corresponding to each band exists, according to the frequency representatives corresponding to each band, in order to determine a frequency of a video carrier corresponding to each band, where the frequency of the video carrier corresponding to each band is utilized as a reference for tuning to a corresponding channel of a plurality of channels such as the (N+1) channels $CH(0), CH(1), \ldots,$ and $CH(N)$. Additionally, the storage mentioned above (e.g. the memory 140 or the non-volatile memory) is arranged to store the frequency of the video carrier corresponding to each band as the reference for tuning to the corresponding channel of the plurality of channels.

Figure 3:
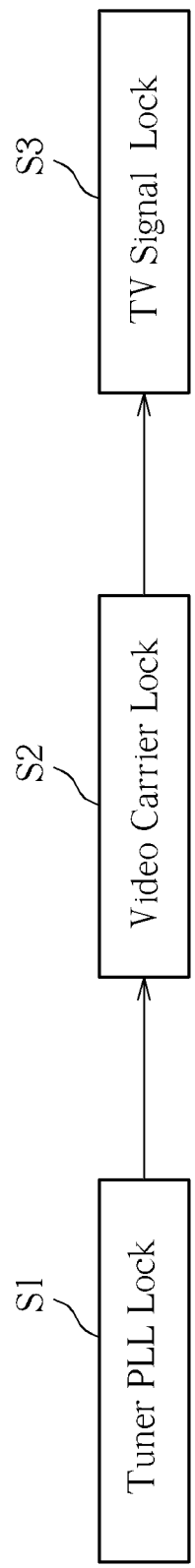
FIG. 3 illustrates a plurality of statuses involved with the method shown in FIG. 2 according to an embodiment of the present invention.

FIG. 3 illustrates a plurality of statuses S1, S2, and S3 involved with the method 910 shown in FIG. 2 according to an embodiment of the present invention. In each of the (N+1) iterations, when it is applicable, the controller 130 controls the multi-channel broadcasting program receiver 100 to achieve a tuner phase lock loop (PLL) lock in the first status S1 (labeled "Tuner PLL Lock" in FIG. 3), achieve a video carrier lock in the second status S2 (labeled "Video Carrier Lock" in FIG. 3), and achieve a TV signal Lock in the third status S3 (labeled "TV signal Lock" in FIG. 3). The method 910 shown in FIG. 2 can reduce the overall channel scan time by rapidly achieving the video carrier lock in each iteration.

Figure 4:
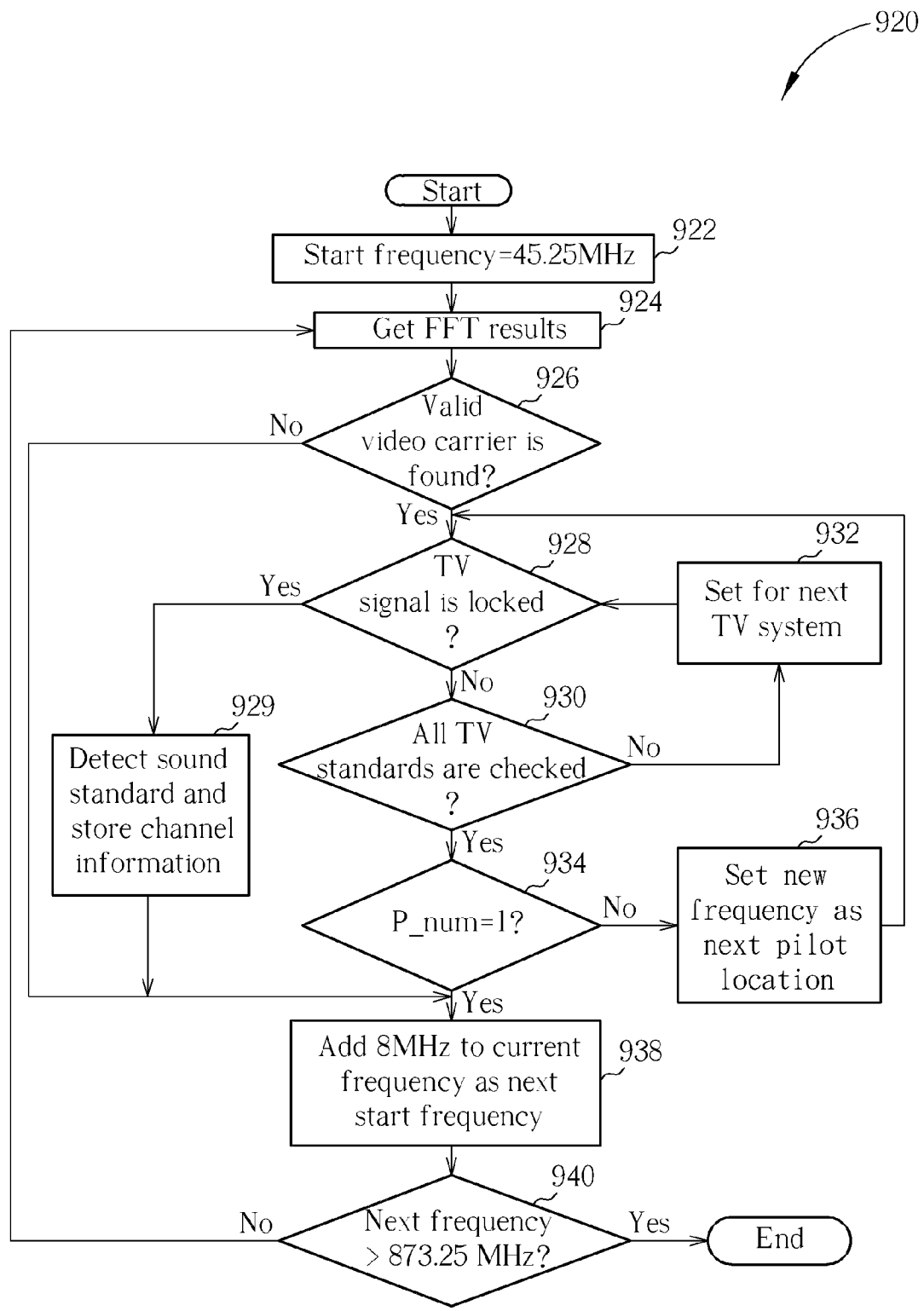
FIG. 4 illustrates a control procedure comprising implementation details of the method shown in FIG. 2 according to an embodiment of the present invention.

FIG. 4 illustrates a control procedure 920 comprising implementation details of the method 910 shown in FIG. 2 according to an embodiment of the present invention, where this embodiment is a variation of the embodiment shown in FIG. 2. The controller 130 of this embodiment operates according to a code 140C', which is a varied version of the code 140C. The control procedure 920 is described as follows.

In Step 922, the controller 130 initially sets the start frequency $F_{start}$ to be 45.25 MHz. In this embodiment, the start frequency $F_{start}$ represents a start frequency of the channel scan for the band B(0).

In Step 924, the controller 130 gets FFT results by performing FFT operations. In particular, the controller 130 stores the FFT results corresponding to the interval [$F_{start}$+0 MHz, $F_{start}$+6.5 MHz] on the frequency domain, and further determine whether there is any pilot whose power is greater than a predetermined threshold VIF_Th within the interval [$F_{start}$+0 MHz, $F_{start}$+6.5 MHz] on the frequency domain according to the FFT results. When it is determined that a pilot whose power is greater than the predetermined threshold VIF_Th is found, the controller 130 records the frequency of the pilot that is just found (i.e. the pilot location on the frequency axis), and further records a parameter P_num representing the number of pilots that are found according to the FFT results corresponding to the interval [$F_{start}$+0 MHz, $F_{start}$+6.5 MHz]. In particular, when Step 924 is re-entered in the subsequent iterations, the controller 130 can update the parameter P_num according to the latest value of the number of pilots that are found according to the FFT results corresponding to the interval [$F_{start}$+0 MHz, $F_{start}$+6.5 MHz] with the start frequency $F_{start}$ having the latest value thereof.

In Step 926, the controller 130 determines whether any valid video carrier is found. According to this embodiment, the controller 130 determines each pilot whose power is greater than the predetermined threshold VIF_Th to be the IF version of a candidate video carrier. In addition, as long as the number of candidate video carriers (i.e. the number of pilots whose power is greater than the predetermined threshold VIF_Th) is greater than or equal to one, the controller 130 determines that a valid video carrier is found. For example, the controller 130 can simply determine whether a valid video carrier is found according to the parameter P_num since the parameter P_num indicates the number of candidate video carriers during the determination of this step. If the controller 130 determines that a valid video carrier is found (i.e. P_num≥1), Step 928 is entered; otherwise (i.e. P_num<1), Step 938 is entered, in order to perform the channel scan for the next band.

In Step 928, the controller 130 determines whether a TV signal is locked. If the controller 130 determines that a TV signal is locked (e.g. the multi-channel broadcasting program receiver 100 achieves the third status S3 mentioned above), Step 929 is entered; otherwise, Step 930 is entered.

In Step 929, the controller 130 detects the sound standard corresponding to the TV signal and stores the channel information of the TV signal. As a result, the TV signal becomes ready for use in the multi-channel broadcasting program receiver 100 since the required information of the channel that is transmitting the TV signal is obtained. Afterward, Step 938 is entered, in order to perform the channel scan for the next band.

In Step 930, the controller 130 determines whether all TV standards are checked. If the controller 130 determines that all TV standards are checked, Step 934 is entered; otherwise, Step 932 is entered, in order to try with another TV standard.

In Step 932, the controller 130 sets for the next TV system. More particularly, the controller 130 sets some control registers to make the multi-channel broadcasting program receiver 100 comply with the next TV standard. Afterward, Step 928 is re-entered, in order to re-try to make the multi-channel broadcasting program receiver 100 achieve the third status S3 mentioned above.

In Step 934, the controller 130 determines whether the parameter P_num is equal to one. If the controller 130 determines that the parameter P_num is equal to one (e.g. the only remaining candidate video carrier is not qualified as a valid video carrier), Step 938 is entered, in order to perform the channel scan for the next band; otherwise, Step 936 is entered, in order to try with another candidate video carrier.

In Step 936, the controller 130 sets the new frequency (i.e. the subsequent frequency to be tried with) as the next pilot location (i.e. the frequency of the next pilot), where the parameter P_num is decreased with a decrease operation such as "P_num-". Afterward, Step 928 is re-entered, in order to re-try to make the multi-channel broadcasting program receiver 100 achieve the third status S3 mentioned above.

In Step 938, the controller 130 adds 8 MHz to the current frequency as the next start frequency. As a result, the start frequency $F_{start}$ is increased to be the beginning of the next band (if exists), such as the lower frequency bond of the next band in this embodiment.

In Step 940, the controller 130 determines whether the next frequency (i.e. the latest value of the start frequency $F_{start}$ during the determination of this step) is greater than 873.25 MHz. If the controller 130 determines that the next frequency is greater than 873.25 MHz, the controller 130 ends the control procedure 920; otherwise, Step 924 is re-entered, in order to try with the next band.

Figure 5:
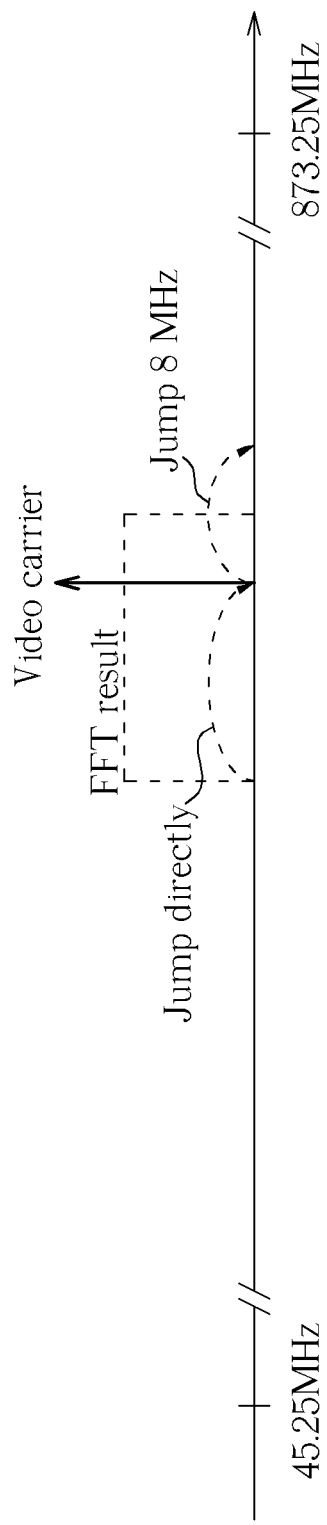
FIG. 5 illustrates a direct jump on the frequency domain during the channel scan for the specific band mentioned in the method shown in FIG. 2 according to a special case of the embodiment shown in FIG. 4.

According to this embodiment, by operating based upon the control procedure 920, the controller 130 can properly determine whether a candidate video carrier is a valid video carrier according to the information recorded in Step 924 (e.g. the pilot location(s) and the parameter P_num), in order to save the time for the multi-channel broadcasting program receiver 100 to achieve the second status S2 mentioned above. Please refer to FIG. 5, which illustrates a direct jump on the frequency domain during the channel scan for the specific band mentioned in Step 912 according to a special case of the embodiment shown in FIG. 4. According to the FFT results obtained in Step 924, the controller 130 can jump directly from the beginning of the band under consideration (e.g. the specific band) to the location where the video carrier is. Afterward, the controller 130 can further jump 8 MHz from the location of the video carrier directly to the next band for further channel scan. As a result of utilizing the above disclosed control procedure 920, the present invention method 910 and the associated multi-channel broadcasting program receiver 100 can greatly save the time for achieving the second status S2 in each iteration mentioned in the embodiment shown in FIG. 2.

Therefore, in contrast to the related art, the present invention method and the associated multi-channel broadcasting program receiver indeed reduce the overall time required for performing channel scan. When using a multi-channel broadcasting program receiver implemented according to the present invention, the users will not suffer in long waiting time during the channel scan operation.

It is another advantage of the present invention that the present invention method and the associated multi-channel broadcasting program receiver can rapidly jump out from a frequency band having no TV signal (e.g. in a situation where the only remaining candidate video carrier is not qualified as a valid video carrier), in order to save time and perform channel scan for the next band as mentioned in Step 934. As a result, the overall time of the channel scan operation can be greatly saved.

According to a variation of the embodiment shown in FIG. 4, when a plurality of suitable pilots obtained according to the FFT results have some relationships complying with the TV standards, the controller 130 can skip the audio signal check and directly jump to a frequency within the next band. For example, in a situation where the video IF signal (e.g. the IF version of the video carrier) is located at a first relative frequency 0 MHz of the interval [$F_{start}$+0 MHz, $F_{start}$+6.5 MHz] and the audio IF signal (e.g. the IF version of the sound carrier) is located at a second relative frequency 5.5 MHz of the interval [$F_{start}$+0 MHz, $F_{start}$+6.5 MHz] on the frequency domain, based upon the NTSC standards, the controller 130 can skip the audio signal check and directly jump to a frequency within the next band (e.g. the beginning of the next band), in order to save time and perform the channel scan for the next band as soon as possible.

Figure 6:
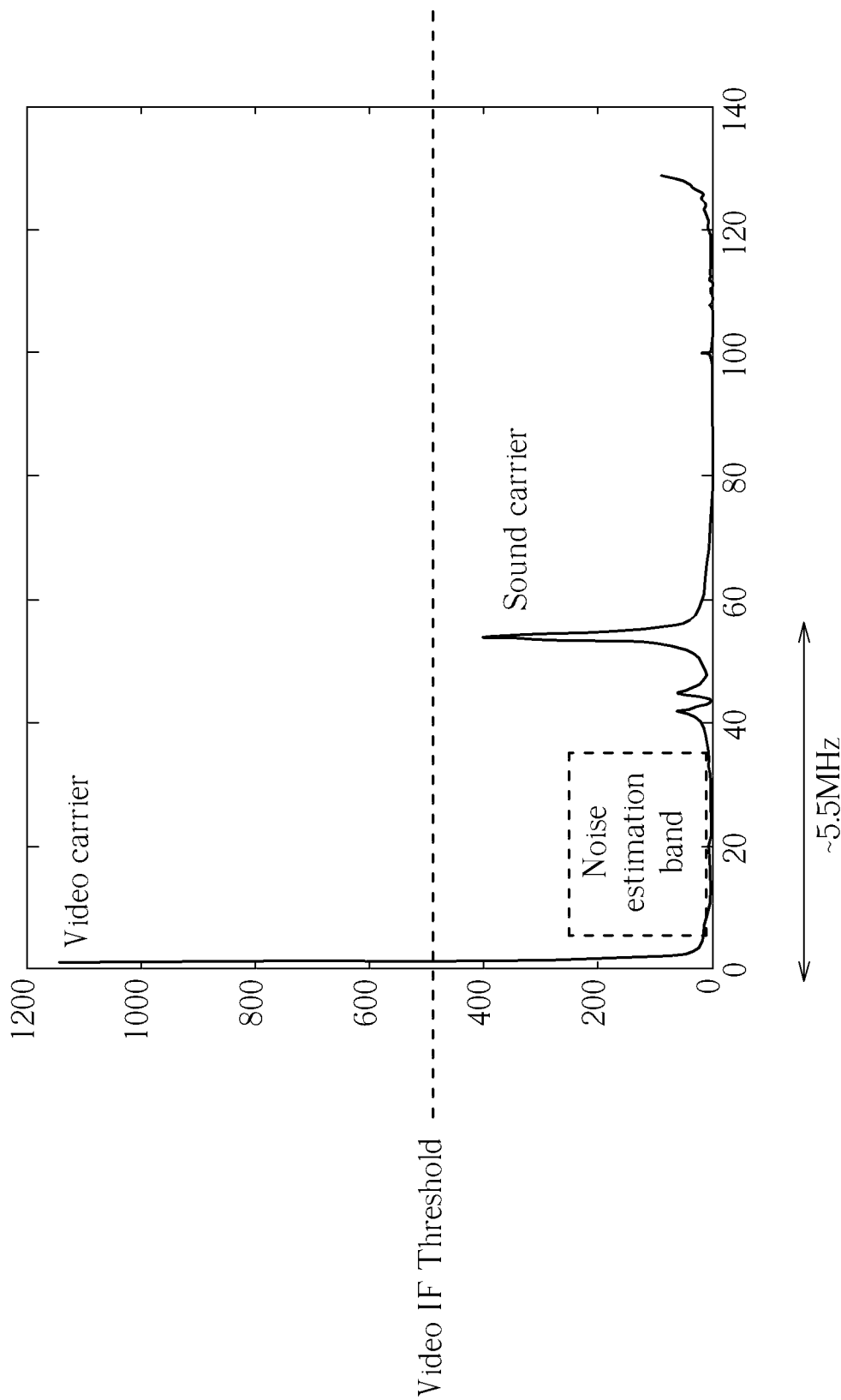
FIG. 6 illustrates a spectrum of normal signals according to a special case of the embodiment shown in FIG. 4.
Figure 7:
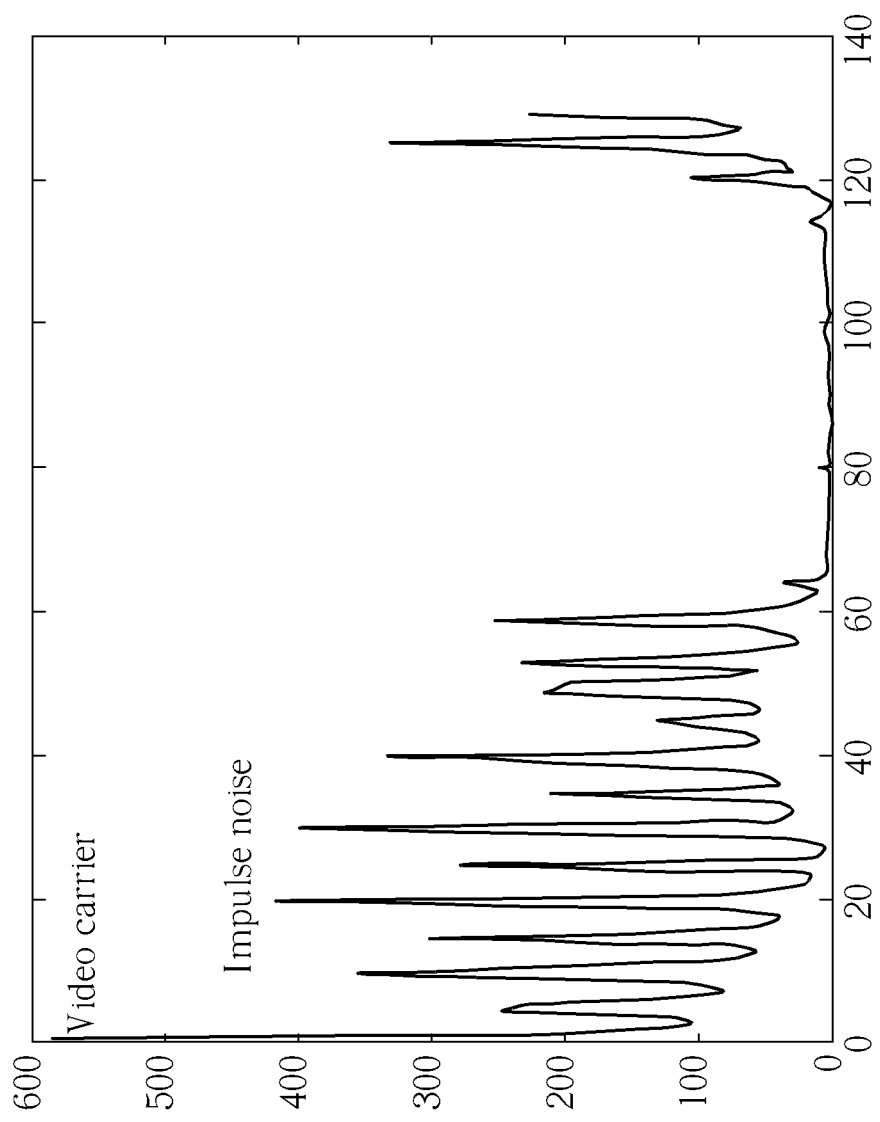
FIG. 7 illustrates a spectrum of abnormal signals having impulse noise according to another special case of the embodiment shown in FIG. 4.
Figure 8:
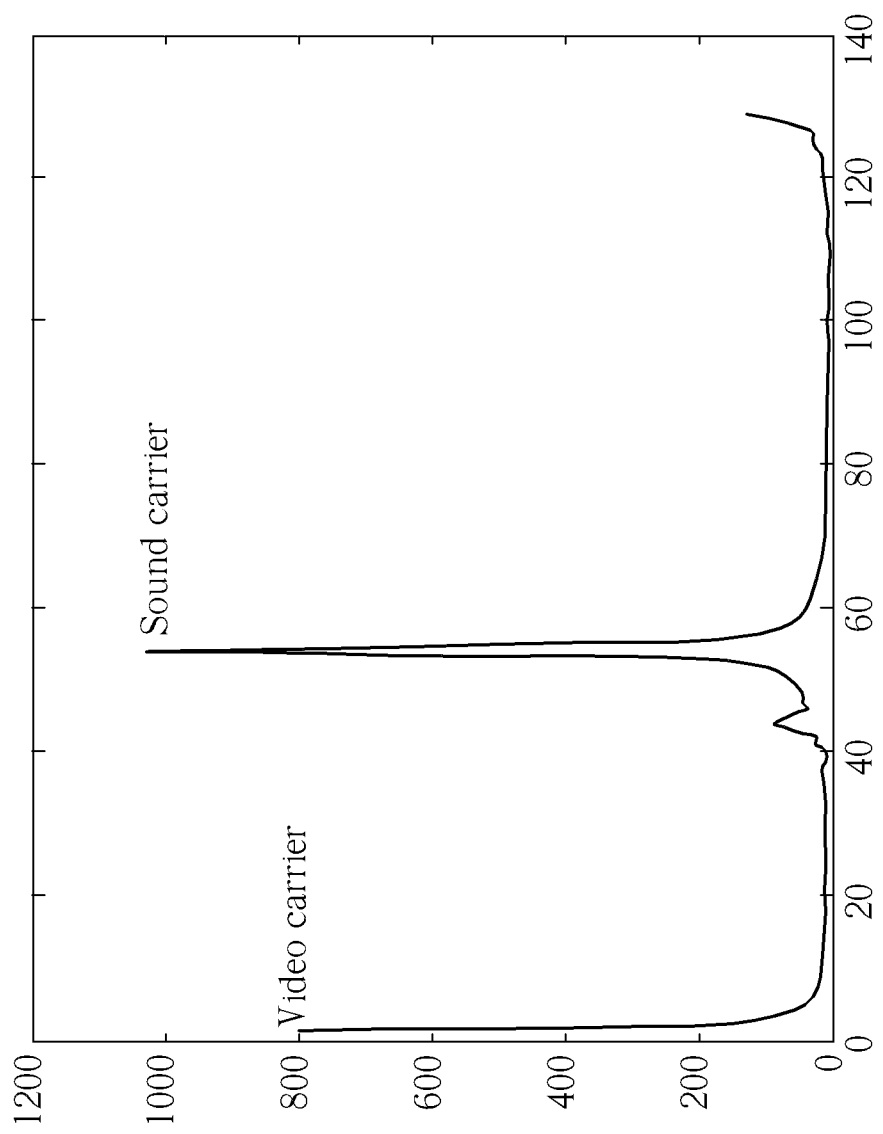
FIG. 8 illustrates a spectrum of abnormal signals according to another special case of the embodiment shown in FIG. 4, where the sound carrier is stronger than the video carrier.

Some implementation details are further described by referring to FIG. 6, FIG. 7, and FIG. 8. FIG. 6 illustrates a spectrum of normal signals according to a special case of the embodiment shown in FIG. 4, where the video carrier is stronger than the sound carrier. FIG. 7 illustrates a spectrum of abnormal signals having impulse noise according to another special case of the embodiment shown in FIG. 4. FIG. 8 illustrates a spectrum of abnormal signals according to another special case of the embodiment shown in FIG. 4, where the sound carrier is stronger than the video carrier. Please note that the pilots labeled as "Video carrier" or "Sound carrier" in FIG. 6, FIG. 7, and FIG. 8 are substantially the IF version of respective video/sound carriers. For simplicity, these pilots are labeled as "Video carrier" or "Sound carrier", respectively.

In a normal situation, such as the situation shown in FIG. 6, when a noise level does not reach a predetermined threshold, such as the video IF threshold shown in FIG. 6 (e.g. the predetermined threshold VIF_Th mentioned above) or another threshold, the controller 130 determines the strongest IF signal of the IF signals (e.g. some pilots such as IF versions of a video carrier and a sound carrier, and some suspicious pilots) to be the video IF signal (e.g. the IF version of the video carrier). In the special case shown in FIG. 6, the pilot labeled "Video carrier" is indeed the IF version of a video carrier.

The controller 130 of this embodiment can obtain the noise level mentioned above according to the frequency representatives corresponding to a predetermined noise estimation band. In practice, the controller 130 can average signal power levels within the noise estimate band as the noise level. As shown in FIG. 6, the noise estimation band is positioned between the pilot labeled "Video carrier" and the pilot labeled "Sound carrier". As all the FFT results corresponding to the specific band B(n) have been obtained in Step 912, the controller 130 can extract a portion of FFT results corresponding to the noise estimation band from all the FFT results, in order to determine whether any impulse noise exists according to the extracted portion of the FFT results. As a result, in the normal situation, the controller 130 can determine the strongest IF signal of the IF signals to be the video IF signal.

In a situation where the impulse noise exists, such as the situation shown in FIG. 7, however, the controller 130 can utilize one or more additional criteria to make sure the determination of the locations of the video carrier and/or the sound carrier. For example, when the noise level reaches the predetermined threshold, such as the video IF threshold shown in FIG. 6 (e.g. the predetermined threshold VIF_Th mentioned above) or another threshold, the controller 130 can determine an IF signal of the IF signals that is most close to a predetermined side of an associated IF band to be the video IF signal. This is for illustrative purposes only, and is not meant to be a limitation of the present invention. According to a variation of this embodiment (e.g. a variation of the special case shown in FIG. 7), when the noise level reaches the predetermined threshold, the controller 130 can determine an IF signal of the IF signals that is larger than the predetermined threshold to be the video IF signal.

According to the special case shown in FIG. 7, the associated IF band is substantially the whole IF band under consideration, while the predetermined side is the lower frequency part of the IF band as illustrated. That is, in this situation, the controller 130 determines the IF signal with the lowest frequency to be the video IF signal. After the location of the video carrier on the frequency domain is determined, the controller 130 can determine the location of the sound carrier on the frequency domain according to the TV standards.

In another situation such as that shown in FIG. 8, the sound carrier is stronger than the video carrier, causing the criterion based upon the predetermined threshold such as the video IF threshold shown in FIG. 6 (e.g. the predetermined threshold VIF_Th mentioned above) to be unsuitable for use. The controller 130 of this embodiment can determine according to one or more criteria to guarantee the correctness of the determination. For example, the controller 130 can still determine the IF signal with the lowest frequency in the whole IF band to be the video IF signal. In another example, the controller 130 can double check with the criterion based upon the predetermined threshold and the criterion based upon the predetermined side of the associated IF band. This is for illustrative purposes only, and is not meant to be a limitation of the present invention. According to a variation of this embodiment, the controller 130 can compare the locations of the sound carrier with the locations of the video carrier, in order to determine whether the special case shown in FIG. 8 occurs since the order of the video carrier and the sound carrier on the frequency should comply with the TV standards.

Those skilled in the art will readily observe that numerous modifications and alterations of the device and method may be made while retaining the teachings of the invention.

What is claimed is:

1. A method for performing blind channel scan within an analog multi-channel broadcasting program receiver, the method comprising:
    performing frequency transform on intermediate frequency (IF) signals of one or more received analog multi-channel broadcasting program signals within a specific band of a plurality of bands to obtain frequency transform results as frequency representatives of the IF signals;
    locating a video IF signal out of the IF signals according to the frequency representatives in order to determine a frequency of a video carrier corresponding to the specific band;
    jumping directly from the start frequency of the specific band to the location where the video carrier is;
    utilizing the frequency of the video carrier as a reference for tuning to an associated channel; and
    jumping from the location of the video carrier directly to the start frequency of the next band for further channel scan.

2. The method of claim 1, further comprising:
    storing the frequency of the video carrier corresponding to the specific band as the reference for tuning to the associated channel.

3. The method of claim 1, wherein the step of performing the frequency transform on the IF signals of the received analog multi-channel broadcasting program signals within the specific band to obtain the frequency transform results as the frequency representatives of the IF signals further comprises:

calculating a plurality of frequency representatives of IF signals of one or more received analog multi-channel broadcasting program signals within each band of the plurality of bands.

4. The method of claim 1, wherein the frequency transform comprises Fast Fourier Transform (FFT); and the frequency transform results are FFT results.

5. The method of claim 1, wherein the frequency transform comprises Discrete Cosine Transform (DCT); and the frequency transform results are DCT results.

6. The method of claim 1, wherein the step of locating the video IF signal out of the IF signals according to the frequency representatives in order to determine the frequency of the video carrier corresponding to the video IF signal further comprises:

when a noise level does not reach a predetermined threshold, determining a strongest IF signal of the IF signals to be the video IF signal.

7. The method of claim 1, wherein the step of locating the video IF signal out of the IF signals according to the frequency representatives in order to determine the frequency of the video carrier corresponding to the video IF signal further comprises:

when a noise level reaches a predetermined threshold, determining an IF signal of the IF signals that is larger than a predetermined threshold to be the video IF signal.

8. The method of claim 3, wherein the step of locating the video IF signal out of the IF signals according to the frequency representatives in order to determine the frequency of the video carrier corresponding to the video IF signal further comprises:

locating a video IF signal out of the IF signals of the one or more received analog multi-channel broadcasting program signals within each band, if the video IF signal corresponding to the band exists, according to the frequency representatives corresponding to the band, in order to determine a frequency of a video carrier corresponding to each band, wherein the frequency of the video carrier corresponding to each band is utilized as a reference for tuning to a corresponding channel of a plurality of channels.

9. The method of claim 8, further comprising:

storing the frequency of the video carrier corresponding to each band as the reference for tuning to the corresponding channel of the plurality of channels.

10. An analog multi-channel broadcasting program receiver, comprising:

a tuner arranged to select one of a plurality of channels; and
a controller arranged to control the analog multi-channel broadcasting program receiver to perform blind channel scan according to code embedded in the controller or received from outside the controller, wherein the controller is arranged to perform frequency transform on intermediate frequency (IF) signals of one or more received analog multi-channel broadcasting program signals within a specific band of a plurality of bands to obtain frequency transform results as frequency representatives of the IF signals;
wherein the controller is arranged to locate a video IF signal out of the IF signals according to the frequency representatives in order to determine a frequency of a video carrier corresponding to the specific band, and is arranged to jump directly from the start frequency of the specific band to the location where the video carrier is, utilize the frequency of the video carrier as a reference for tuning to an associated channel, and jump from the location of the video carrier directly to the start frequency of the next band for further channel scan.

11. The analog multi-channel broadcasting program receiver of claim 10, further comprising:

a storage arranged to store the frequency of the video carrier corresponding to the specific band as the reference for tuning to the associated channel.

12. The analog multi-channel broadcasting program receiver of claim 10, wherein the controller is arranged to calculate a plurality of frequency representatives of IF signals of one or more received analog multi-channel broadcasting program signals within each band of the plurality of bands.

13. The analog multi-channel broadcasting program receiver of claim 10, wherein the frequency transform comprises Fast Fourier Transform (FFT); and the frequency transform results are FFT results.

14. The analog multi-channel broadcasting program receiver of claim 10, wherein the frequency transform comprises Discrete Cosine Transform (DCT); and the frequency transform results are DCT results.

15. The analog multi-channel broadcasting program receiver of claim 10, wherein when a noise level does not reach a predetermined threshold, the controller determines a strongest IF signal of the IF signals to be the video IF signal.

16. The analog multi-channel broadcasting program receiver of claim 10, wherein when a noise level reaches a predetermined threshold, the controller determines an IF signal of the IF signals that is larger than a predetermined threshold to be the video IF signal.

17. The analog multi-channel broadcasting program receiver of claim 12, wherein the controller is arranged to locate a video IF signal out of the IF signals of the received analog multi-channel broadcasting program signals within each band, if the video IF signal corresponding to the band exists, according to the frequency representatives corresponding to the band, in order to determine a frequency of a video carrier corresponding to each band;

and the frequency of the video carrier corresponding to each band is utilized as a reference for tuning to a corresponding channel of a plurality of channels.

18. The analog multi-channel broadcasting program receiver of claim 17, further comprising:

a storage arranged to store the frequency of the video carrier corresponding to each band as the reference for tuning to the corresponding channel of the plurality of channels.

* * * * *